United States Patent Office 2,757,176
Patented July 31, 1956

2,757,176

TETRA-SUBSTITUTED PYRIDINES AND PROCESS FOR THEIR PREPARATION

Reuben G. Jones, Indianapolis, Ind., assignor to Eli Lilly and Company, Indianapolis, Ind., a corporation of Indiana No Drawing. Application November 10, 1954, Serial No. 468,143

6 Claims. (Cl. 260—294.9)

My invention relates to a novel derivative of pyridine and to a process for its preparation. More particularly, it relates to a new tetra-substituted derivative of pyridine which is readily convertible by chemical means to pyridoxine (vitamin $B_6$).

It is an object of this invention to provide a means for transforming a readily available penta-substituted pyridine derivative into a hitherto unknown tetra-substituted pyridine derivative in which the substituent groups occupy positions corresponding to the positions of substituent groups in pyridoxine, and in which the substituent groups, as found in my novel compound, are readily convertible into the substituent groups as found in pyridoxine itself by the methods available to the art.

By this invention I have provided a process whereby a readily available penta-substituted pyridine derivative, a triester of 2-methyl-3-cyano-4,5,6-pyridine tricarboxylic acid, as disclosed in my co-pending application Serial No. 426,563, April 29, 1954, surprisingly can be partially and selectively saponified under mild hydrolytic conditions to a novel pyridine diester monocarboxylic acid, in which only the ester group in the 6-position of the pyridine triester has been removed by saponification. Furthermore, I have found that this intermediate pyridine diester monocarboxylic acid can be decarboxylated by heating at or about its boiling point to yield a diester of 2-methyl-3-cyano-4,5-pyridine dicarboxylic acid.

The hydrolytic conditions under which the triester of 2-methyl-3-cyano-4,5,6-pyridine tricarboxylic acid is converted to a compound having a free carboxyl group in the 6-position must be selective to avoid undesirable hydrolytic reaction. For example, it would be expected that the ester groups in the 4- and 5-positions in the pyridine ring would be hydrolyzed equally with the ester group in the 6-position. Furthermore, it would be expected that any basic hydrolysis would affect also the cyano group in the 3-position of the pyridine ring.

I have now found that the conditions necessary to accomplish the desired partial and selective hydrolysis of the ester group in the 6-position comprise a mild homogeneous hydrolytic reaction using only one equivalent of a strong base in dilute solution. Bases useful in this process are exemplified by the alkali metal hydroxides or carbonates such as sodium hydroxide, potassium hydroxide, sodium carbonate, and the like. Conveniently, the bases are employed in dilute aqueous solution to which a lower aliphatic alcohol is added in order to maintain a homogeneous hydrolysis mixture. Dilute aqueous alkali of a strength of the order of 1 normal is employed and when it is added to the lower alcoholic solution of the triester, the final concentration of alkali is in the range of 0.1 to 0.75 normal or greater. However, it should be understood that the final concentration of the alkali is not critical provided that only 1 equivalent of alkali is used. This hydrolysis is carried out under mild reaction conditions as regards temperature and pressure in that the temperature is maintained in the range from about 20° C. to 30° C. and atmospheric pressures are used. A preferred method of hydrolysis consists in treating a lower aliphatic alcoholic solution of the triester with 1 molecular equivalent of sodium hydroxide as a 0.4 N aqueous solution at room temperature for several hours. During this time the ester group in the 6-position is saponified, yielding a sodium salt of a 4,5-di-lower alkyl ester of 2-methyl-3-cyano-4,5,6-pyridine tricarboxylic acid. This sodium salt is then isolated as by evaporation of the solvent in vacuo, and is then converted to the corresponding acid, preferably by treatment with strong mineral acid, according to the methods heretofore employed in the art for effecting such conversions.

The second step of my novel process involves the decarboxylation of 4,5-di-lower alkyl ester of 2-methyl-3-cyano-4,5,6-pyridine tricarboxylic acid. This decarboxylation is readily effected by heating the compound to a temperature at which carbon dioxide is evolved. This temperature is somewhat below the boiling point of the compound. The decarboxylation reaction is preferably carried out in vacuo to avoid undue decomposition of the starting material or final product which might be caused by prolonged heating at high temperatures. The decarboxylated compound prepared by this process is then purified, if desired, as by distillation in high vacuum. Alternately concomitant decarboxylation and distillation can be employed.

The compound provided by my novel process, a diester of 2-methyl-3-cyano-4,5-pyridine dicarboxylic acid, is converted to pyridoxine by the following process steps which are employed: The cyano group is hydrolyzed with concentrated sulfuric acid to either the 3-amido compound or the 3,4-carbimido compound, depending on the temperature used for the hydrolysis. Either of these latter compounds, when subjected to a Hofmann rearrangement with an alkali hypohalite, yields 2-methyl-3-amino-4,5-pyridine dicarboxylic acid. This compound can be transformed into pyridoxine by methods disclosed in my co-pending application Serial No. 426,564, filed April 29, 1954, now Patent No. 2,724,714.

For reasons of convenience, I have illustrated my invention in the previous discussion and in the examples which follow with tri- or diethyl esters of the pyridine trior dicarboxylic acids. It should be understood that other esterifying groups which can be hydrolyzed under the conditions of the first step of my process, can be employed in place of the ethyl ester group, as for example, methyl ester groups, propyl ester groups, and the like.

The following specific examples set forth the presently preferred methods of preparing the compounds and carrying out the processes of my invention:

EXAMPLE 1

*Preparation of 2-methyl-3-cyano-4,5-dicarbethoxy-6-pyridine carboxylic acid*

34 g. of triethyl 2-methyl-3-cyano-4,5,6-pyridine tricarboxylate are dissolved in 150 ml. of 95 per cent ethanol and the solution is cooled to about −5° C. 100 ml. of 1 N sodium hydroxide is added thereto with stirring during an interval of 15 minutes. The resulting solution is allowed to stand at room temperature for about four hours, thus saponifying only the ester grouping in the 6-position of the pyridine ring. The solvents are then removed in vacuo. The resulting residue is washed with ether. The white crystalline sodium salt remaining after this washing procedure is next washed with a mixture of acetone and ether and is then dried. A yield of 25 g. of crude sodium 2-methyl-3-cyano-4,5-dicarbethoxy-6-pyridine carboxylic acid is obtained. From the ether washings mentioned above, about 5.5 g. of unchanged triester starting material can be recovered. The yield, based on recovered starting material, is 88 per cent.

A solution of 15 g. of the above sodium salt in 100 ml. of water is acidified with 10 ml. of 12 N hydrochloric acid. An oil separates which crystallizes on scratching with a glass rod. After recrystallizing twice from water and separating the resulting crystals, 2-methyl-3-cyano-4,5-dicarbethoxy-6-pyridine carboxylic acid is obtained. These crystals, after drying in vacuo, melt partially at 60–65° C., resolidify, and finally melt sharply at 96–97° C. The yield is about 10 g. or about 75% of theoretical.

*Analysis.*—Calc'd.: C, 54.90; H, 4.61; N, 9.15. Found: C, 55.15; H, 4.73; N, 8.88.

EXAMPLE 2

*Preparation of diethyl 2-methyl-3-cyano-4,5-pyridine dicarboxylate*

8.5 g. of solid 2-methyl-3-cyano-4,5-dicarboethoxy-6-pyridine carboxylic acid are heated slowly in vacuo to the point where decarboxylation is initiated. Carbon dioxide begins to be evolved, as evidenced by a bubbling of the liquid melt at a temperature in the range of 100° C. to 140° C. Heating is continued in vacuo until no further evolution of carbon dioxide is evidenced. At this point a clear viscous liquid comprising diethyl 2-methyl-3-cyano-4,5-pyridine dicarboxylate remains in the flask. It is distilled in vacuo, and the collected distillate redistilled in vacuo. The fraction collected in this second distillation boils at about 141–143° C. at a pressure of about .1 mm. Hg. The yield of diethyl 2-methyl-3-cyano-4,5-pyridine dicarboxylate so obtained is about 5.7 g. The physical characteristics and analysis of diethyl 2-methyl-3-cyano-4,5-pyridine dicarboxylate are as follows:

$$n_D^{25} = 1.5080; d_{25}^{25} = 1.168$$

*Analysis.*—Calc'd.: C, 59.53; H, 5.38; N, 10.68. Found: C, 59.84; H, 5.62; N, 10.71.

Having set forth my invention, I claim:

1. A method of preparing di-lower alkyl esters of 2-methyl-3-cyano-4,5-pyridine dicarboxylic acid which comprises treating a tri-lower alkyl ester of 2-methyl-3-cyano-4,5,6-pyridine tricarboxylic acid with about 1 equivalent of a strong base under mild conditions, thereby selectively and partially saponifying said triester in the 6-position and then decarboxylating said selectively saponified triester.

2. The method of preparing a di-lower alkyl ester of 2-methyl-3-cyano-4,5-pyridine dicarboxylic acid which comprises treating a tri-lower alkyl ester of 2-methyl-3-cyano-4,5,6-pyridine tricarboxylic acid with about 1 equivalent of a cold dilute aqueous solution of an alkali metal hydroxide to saponify only that lower alkyl ester in the 6-position and then heating the resulting diester acid to decarboxylate said diester acid, in the 6-position.

3. A di-lower alkyl ester of 2-methyl-3-cyano-4,5-pyridine dicarboxylic acid.

4. Diethyl 2 - methyl - 3 - cyano-4,5-pyridine dicarboxylate.

5. A 4,5-di-lower alkyl ester of 2-methyl-3-cyano-4,5,-6-pyridine tricarboxylic acid.

6. 2 - methyl-3-cyano-4,5-dicarbethoxy-6-pyridine carboxylic acid.

References Cited in the file of this patent

OTHER REFERENCES

Jones: J. Am. Chem. Soc., vol. 73, pp. 5244–7 (1951).
Jones: J. Am. Chem. Soc., vol. 73, pp. 5610–14 (1951).